(12) United States Patent
Ammon

(10) Patent No.: US 9,188,020 B2
(45) Date of Patent: Nov. 17, 2015

(54) VARIABLE TURBINE GEOMETRY

(71) Applicant: Bosch Mahle Turbo Systems GmbH & Co. KG, Stuttgart (DE)

(72) Inventor: Volkhard Ammon, Pliezhausen (DE)

(73) Assignee: Bosch Mahle Turbo Systems GmbH & Co. KG (DE)

( * ) Notice: Subject to any disclaimer, the term of this patent is extended or adjusted under 35 U.S.C. 154(b) by 534 days.

(21) Appl. No.: 13/686,903

(22) Filed: Nov. 27, 2012

(65) Prior Publication Data

US 2013/0136581 A1 May 30, 2013

(30) Foreign Application Priority Data

Nov. 28, 2011 (DE) .......................... 10 2011 087 244

(51) Int. Cl.
  *F01D 17/16* (2006.01)
  *F02C 6/12* (2006.01)
  *F01D 9/04* (2006.01)

(52) U.S. Cl.
  CPC ............... *F01D 17/16* (2013.01); *F01D 9/041* (2013.01); *F01D 17/165* (2013.01); *F02C 6/12* (2013.01); *F05D 2240/128* (2013.01); *F05D 2250/90* (2013.01)

(58) Field of Classification Search
  CPC ........... F01D 9/02; F01D 9/041; F01D 17/16; F01D 17/165; F05D 2240/128; F05D 2250/90; F02C 6/12
  See application file for complete search history.

(56) References Cited

U.S. PATENT DOCUMENTS

| 3,232,581 A | 2/1966 | Swearingen |
| 6,269,642 B1 * | 8/2001 | Arnold et al. .................. 60/602 |
| 6,527,508 B2 * | 3/2003 | Groskreutz et al. .......... 415/164 |
| 6,951,450 B1 * | 10/2005 | Figura et al. .................. 417/407 |
| 2003/0026694 A1 | 2/2003 | Groskreutz et al. |
| 2009/0301083 A1 * | 12/2009 | Rayner et al. .................. 60/602 |

FOREIGN PATENT DOCUMENTS

| DE | 102008049005 A1 | 4/2010 |
| DE | 102008053170 A1 | 4/2010 |
| DE | 102010020026 A1 | 11/2011 |
| DE | 102010043145 A1 | 5/2012 |
| WO | WO-2009/102546 A1 | 8/2009 |

OTHER PUBLICATIONS

English abstract for DE-102010043145.
English abstract for DE-102008049005.
English abstract for DE-102008053170.
German search report for DE102011087244.2.

* cited by examiner

*Primary Examiner* — Ninh H Nguyen
(74) *Attorney, Agent, or Firm* — Fishman Stewart Yamaguchi PLLC

(57) ABSTRACT

A variable turbine geometry may have guide blades rotatably mounted in a blade bearing ring. An adjusting ring may be arranged on the bearing ring and an actuator may be configured to adjust the adjusting ring via a link lever. An adjustable eccentric may be arranged on the link lever and guided in a groove arranged on the blade bearing ring. The eccentric may be configured to stop on at least one end of the groove to limit at least one minimal flow through the variable turbine geometry.

20 Claims, 2 Drawing Sheets

VARIABLE TURBINE GEOMETRY

CROSS-REFERENCE TO RELATED APPLICATION

This application claims priority to German Patent Application 10 2011 087 244.2, filed Nov. 28, 2011, which is hereby incorporated by reference in its entirety.

TECHNICAL FIELD

The present invention relates to a variable turbine geometry which comprises guide plates rotatably mounted in a blade bearing ring according to the preamble of claim 1. The invention additionally relates to a charging device having such a variable turbine geometry and to a combustion engine having such a charging device.

BACKGROUND

With a variable turbine geometry it is required to exactly define and under certain conditions also limit a minimal flow, wherein this minimal flow corresponds to a corresponding position of the individual guide blades of the variable turbine geometry. Up to now, this is being achieved for example by means of a threaded pin which runs between an actuating device and a link lever of the variable turbine geometry and via which by means of a rotary movement a relative position between the link lever and the actuator can be exactly defined.

From DE 10 2008 049 005 A1 a variable turbine geometry for a charging device, in particular for an exhaust gas turbocharger for a motor vehicle is known, which comprises guide blades that are rotatably mounted in a guide blade ring. For adjusting the guide blades, an adjusting ring is thereby provided, which can be adjusted by an actuator via a link lever. Here, at least one profile is provided on the adjusting ring, which engages in at least one recess on the blade bearing side, wherein the profile interacts with the recess in such a manner that an adjusting movement of the adjusting ring is limited relative to the blade bearing ring and thus for example a minimum flow rate through the variable turbine geometry.

The variable turbine geometries known from the prior art however altogether have the disadvantage that for ensuring or limiting the minimal flow through the variable turbine geometry, comparatively complex limiting devices have to be installed, which in addition require a need for installation space that must not be underestimated.

SUMMARY

The present invention therefore deals with the problem of stating an improved or at least an alternative embodiment for a variable turbine geometry of the generic type, which is characterized in particular by a compact design and a simple construction.

According to the invention, this problem is solved through the subjects of the independent claims. Advantageous embodiments are subject of the dependent claims.

The present invention is based on the general idea of providing an adjustable eccentric for a limitation of the position of a variable turbine geometry, in particular for limiting a minimal flow through the variable turbine geometry, which is arranged on a link lever for adjusting the variable turbine geometry and guided in a groove arranged on a blade bearing ring. The variable turbine geometry according to the invention in this case comprises guide blades which are rotatably mounted in the blade bearing ring in the known manner, wherein for adjusting the guide blades an adjusting ring is provided, which can be adjusted by an actuator via the link lever. The adjustable eccentric, which at the same time is guided in the groove arranged on the blade bearing ring, is arranged on the link lever. At least one minimal flow through the variable turbine geometry is limited through a stop of this eccentric on at least one end of the groove on the blade bearing ring side. Thus, the link lever according to the invention has two functions, namely on the one hand to transmit the actuating movement generated by the actuator to the adjusting ring and thus to the variable turbine geometry and on the other hand to limit the adjusting movement via the eccentric. Thus, a limiting device of particularly compact construction and consequently requiring little installation space can be created, which substantially consists of an eccentric additionally arranged on a link lever head and an associated groove arranged on the blade bearing ring. Compared with the previously required threaded rods and lock nuts, etc., not only a comparatively simple assembly and a reduction of the parts variety can be achieved, but at the same time also a solution of particularly compact construction which is of particular advantage with an installation space availability that is steadily diminishing in modern engine compartments. It is expressly emphasised at this point that in the previous paragraphs and in the following description the discussion always relates to a variable turbine geometry wherein the principle according to the invention can obviously also be transferred to a variable compressor geometry.

With an advantageous further development of the solution according to the invention, the eccentric is caulked, riveted or spread. Obviously, further embodiments, such as for example a gluing, soldering or welding are also conceivable. In the case of an spreading, the eccentric for example comprises a sleeve body which can be inserted into an opening formed in the link lever head, so that a holding portion of the sleeve body is arranged in the interior of the opening. A core or spreading body, which is arranged in the interior of the sleeve body and in the assembled state radially braces the holding portion with an inner wall of the opening radially delimiting the opening, thereby fixing the eccentric on the link lever head axially and/or in a rotationally fixed manner is also provided. Also conceivable is a riveting of the eccentric to the link lever head, for example in the manner of a blind rivet connection. Advantageously, the eccentric or cam can still be adjusted in this case up to just before completion of the assembly, so that the eccentric is adjusted only in the region of the final inspection and via this the minimal flow through the variable turbine is adjusted in order to subsequently fix the eccentric to the associated link lever. Because of this, the offsetting of production tolerances in particular is comparatively easily possible.

With an advantageous further development of the solution according to the invention, the sleeve body on its outside comprises a friction-increasing layer in the holding portion, wherein it can be provided in particular that the friction-increasing layer is a chemical nickel matrix with silicon carbide particles embedded therein. With such a friction-increasing layer, in particular also caused through a corresponding roughness, an adhesive friction force between the sleeve body and the inner wall of the opening in the link lever head can be increased and because of this the fixing of the eccentric on the link lever head, amplified. Embedded silicon carbide particles in this case take over the increase of the roughness and because of this amplify the adhesive friction.

Further important features and advantages of the invention are obtained from the subclaims, from the drawings and from the associated Figure description by means of the drawings.

It is to be understood that the features mentioned above and still to be explained in the following cannot only be used in the respective combination stated but also in other combinations or by themselves, without leaving the scope of the present invention.

Preferred exemplary embodiments of the invention are shown in the drawings and are explained in more detail in the following description, wherein same reference characters relate to same or similar or functionally same components.

BRIEF DESCRIPTION OF THE DRAWINGS

It show, in each case schematically.

DETAILED DESCRIPTION

Figure 1:
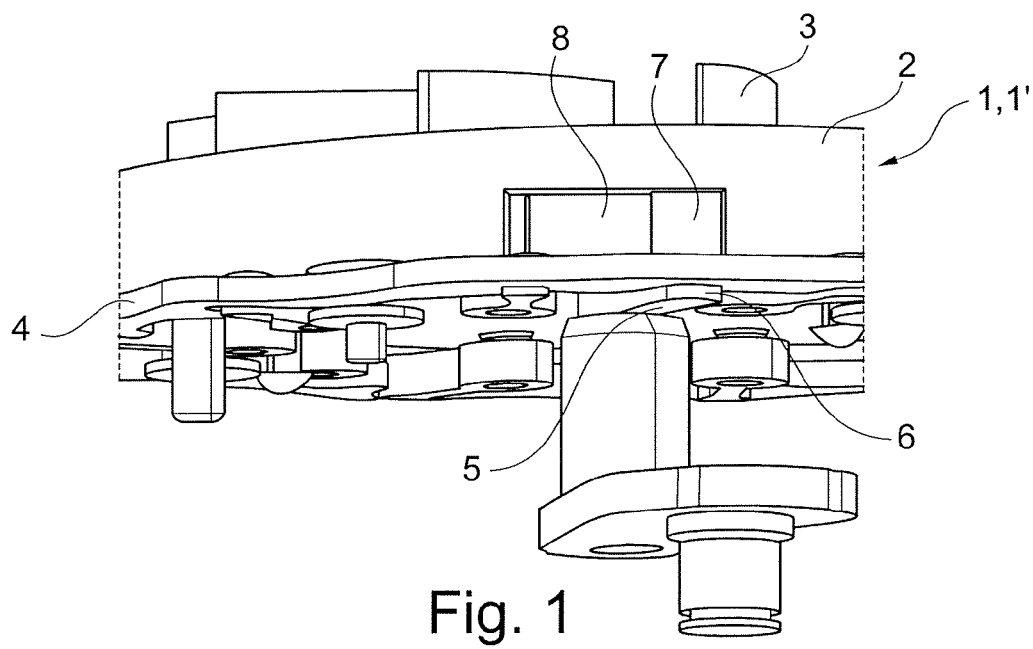
FIG. 1 a view from above of a variable turbine geometry according to the invention, FIG. 2 different detail views of the variable turbine geometry in the region of a link lever, FIG. 3 a sectional representation through a possible embodiment of a link lever having an eccentric fastened thereon, FIG. 4, 5 further sectional representations through possible embodiments of a link lever having an eccentric fastened thereon.

According to FIG. 1, a variable turbine geometry 1, in particular for an exhaust gas turbocharger for a motor vehicle, comprises a blade bearing ring 2 as well as guide blades 3 rotatably mounted therein. For adjusting the guide blades 3, an adjusting ring 4 is provided, which can be adjusted by an actuator which is not described in more detail via a link lever 5. According to FIG. 2, the link lever 5 is shown in detail and carries a link lever head 6, with which it engages into a corresponding opening on the adjusting ring 4 and because of this is able to adjust said adjusting ring. In order to now be able to limit a minimal flow through the variable turbine geometry 1, an adjustable eccentric 7, for example in the manner of a cam, is arranged on the link lever 5, which is guided in a groove 8 arranged on the blade bearing ring 2. At least the minimal flow through the variable turbine geometry 1 is limited in this case through a stop of the eccentric 7 on at least one end, in particular on a longitudinal end of the groove 8. Because of this the actual link lever 5 is assigned two functions, namely on the one hand the adjustment of the guide blades 3 via the adjusting ring 4 and on the other hand the limitation of at least the minimal flow through the eccentric 7 arranged on the link lever head 6 of the link lever 5. If the eccentric 7 is designed for example in the manner of a cam, the latter can influence a maximum deflection of the link lever 5 and thus also a maximum or minimal position of the individual guide blades 3 through a simple rotation relative to the link lever head 6.

Figure 2:
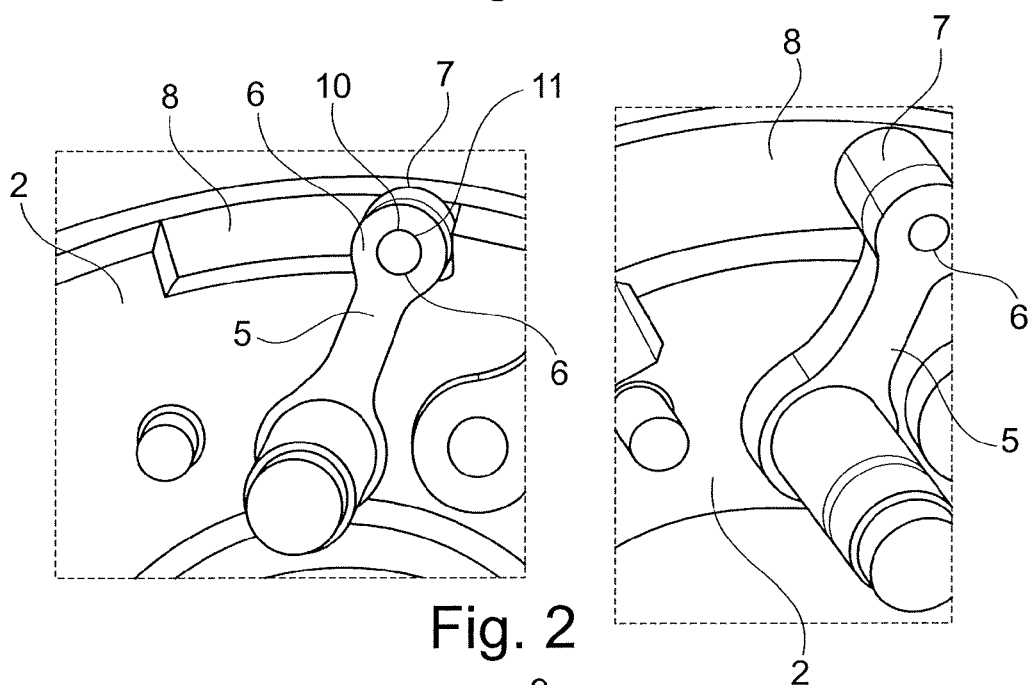
Figure 3:
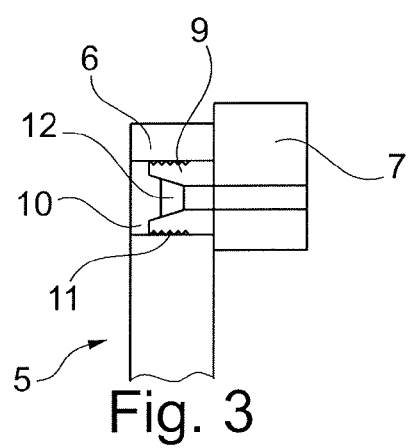

Looking at FIG. 1 to 3 it is evident that the eccentric 7 is formed as axial extension on the link lever head 6, wherein this link lever head 6 interacts with the adjusting ring 4. The groove 8 arranged on the blade bearing ring 2 is preferentially designed open towards a face end and to the outside, as a result of which the link lever 5 with its link lever head 6 and the associated adjusting ring 4 can remain substantially unchanged. A connection between the eccentric 7 and the link lever head 6 can for example be effected through caulking, riveting or spreading (see FIG. 3).

Figure 4:
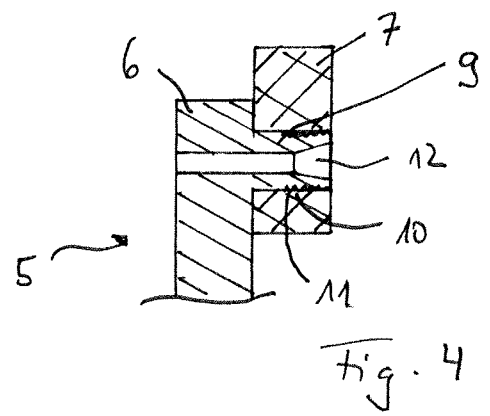

For spreading the eccentric 7 on the link lever head 6 of the link lever 5, the eccentric 7 can comprise a sleeve body 9, which can be inserted into an opening 10 formed on the link lever head 6, so that a holding portion 11 of the sleeve body 9 is arranged in the interior of the opening 10. Additionally, a core body 12, usually also called spreader body, is provided, which is arranged in the interior of the sleeve body 9 and in the assembled state radially braces the holding portion 11 to an inner wall of the opening 10 radially limiting the opening 10 and because of this fixes the eccentric 7 on the link lever head 6 in an axial and/or rotationally fixed manner. In particular the non-rotational fixing is important in this case for the defined and non-releasable adjustment of the minimal flow through the variable turbine geometry 1. Here, the sleeve body 9 can be arranged on the eccentric 7 or on the link lever head 6, as is shown in FIG. 4. In the last mentioned case, a spreading of the core body 12 thus takes place in a corresponding opening 10 of the eccentric 7.

Considering FIG. 3 furthermore, it is evident that the sleeve body 9 in the holding portion 11 has an internal cone which interacts with an external cone of the core body 12 for the radial bracing. Generally, the sleeve body 9 can be designed slit in the region of the holding portion, as a result of which a spreading of the latter is facilitated. The core body 12 itself can for example comprise a cross section in the manner of a truncated cone, a cone, crowned or spherical, in particular also outer cross section.

For improved fixing of the holding portion 11 in the opening 10 of the link lever head 6 of the link lever 5, the sleeve body 9 can comprise a friction-increasing layer additionally on its outside in the region of the holding portion 11, which is for example a chemical nickel matrix with silicon carbide particles embedded therein. A spreading of the core body 12 in the conical portion of the sleeve body 9 can for example be effected by driving in or also by pulling in, wherein the pulling in can be effected for example in the manner of a blind rivet positioning, wherein the pull rod after the spreading of the sleeve body 9 breaks off as from a defined pulling force, as a result of which the eccentric 7 is connected to the link lever head 6 in a non-releasable fixed manner. In general, a gluing, soldering, welding, caulking, etc. is also conceivable instead of such a spreading. With the eccentric 7 configured according to the invention, a connection is non-releasable and thus manipulatable only with difficulty is created between the eccentric 7 and the link lever 5, as a result of which the exhaust gas turbocharger according to the invention can be protected in particular from misuse loads through manipulation. Here, the assembly of the eccentric 7 proves to be comparatively simple, wherein in addition a clearly reduced installation space compared with the previous threaded screws with locknuts is required, which is a major advantage in particular with modern and cramped engine compartments. The adjustment of the variable turbine geometry 1 and in particular of the minimal flow of the latter can also be effected separately in this case, without the variable turbine geometry 1 being already installed in a charging device or an exhaust gas turbocharger. Compared with previous adjusting possibilities, clearly fewer components are required as well, as a result of which the parts variety and thus also the storage and logistical costs can be reduced. Although in the Figure description the discussion always related to a variable turbine geometry 1, it is clear however that the previously mentioned embodiments can also be transferred to a variable compressor geometry 1' in an unchanged manner.

Figure 5:
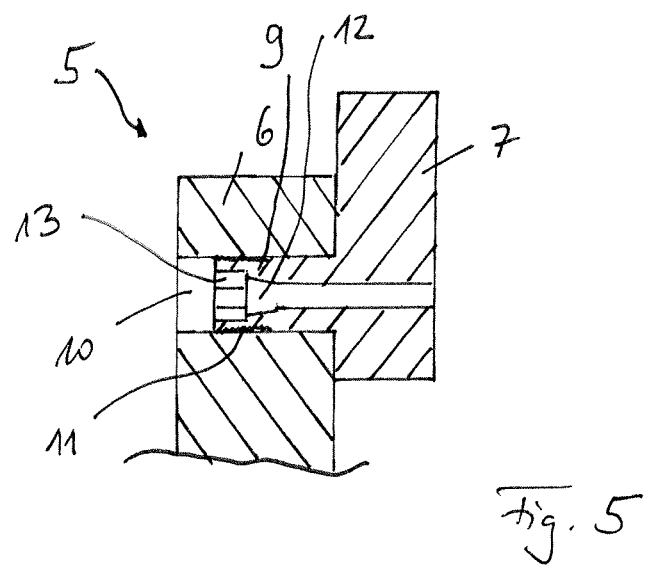

In order to facilitate in particular an alignment of the eccentric 7, an internal polygon (13) or an internal non-round in particular an internal hexagon or a Torx can be provided on the sleeve body 9 which allows a rotationally fixed engaging of a complementary tool, for example of an Allen key. Such an internal polygon 13 in this case is only shown in FIG. 5, wherein it is obviously clear that such can also be provided on the other embodiments

The invention claimed is:

1. A variable turbine geometry, comprising: guide blades rotatably mounted in a blade bearing ring, an adjusting ring arranged on the bearing ring, an actuator configured to adjust the adjusting ring via a link lever,
   an adjustable eccentric arranged on the link lever and guided in a groove arranged on the blade bearing ring,
   wherein the eccentric is configured to stop on at least one end of the groove to limit at least one minimal flow through the variable turbine geometry.

2. The variable turbine geometry according to claim 1, wherein the eccentric is designed as an axial extension on a link lever head, and wherein the link lever head is configured to interact with the adjusting ring.

3. The variable turbine geometry according to claim 2, wherein the eccentric is at least one of caulked, riveted and spread to the link lever head.

4. The variable turbine geometry according to claim 2, wherein the groove on the blade bearing ring is open towards a face end and to the outside of the bearing ring.

5. The variable turbine geometry according to claim 4, wherein the eccentric is at least one of caulked, riveted and spread to the link lever head.

6. The variable turbine geometry according to claim 5, wherein the eccentric includes a sleeve body, which can be inserted into an opening formed in the link lever head, and a holding portion of the sleeve body is arranged in the interior of the opening, and wherein a core body is arranged in the interior of the sleeve body to radially brace the holding portion in the opening and fix the eccentric on the link lever head at least one of axially and rotationally.

7. The variable turbine geometry according to claim 6, wherein the sleeve body in the holding portion includes an internal cone configured to interact with an external cone of the core body for radially bracing the holding portion.

8. The variable turbine geometry according to claim 1, wherein the groove on the blade bearing ring is towards a face end and to the outside of the bearing ring.

9. The variable turbine geometry according to claim 1,
   wherein the eccentric includes a sleeve body, which can be inserted into an opening formed in the link lever head, and a holding portion of the sleeve body is arranged in the interior of the opening,
   wherein a core body is arranged in the interior of the sleeve body to radially brace the holding portion in the opening and fix the eccentric on the link lever head at least one of axially and rotationally.

10. The variable turbine geometry according to claim 9, wherein the sleeve body in the holding portion includes an internal cone configured to interact with an external cone of the core body for radially bracing the holding portion.

11. The variable turbine geometry according to claim 9, wherein the core body has at least one of a crowned and spherically curved outer cross section.

12. The variable turbine geometry according to claim 9, wherein the sleeve body on its outside in the holding portion includes a friction-increasing layer, and wherein the friction-increasing layer is a chemical nickel matrix with silicon carbide particles embedded therein.

13. A charging device comprising: a variable turbine geometry having:
    guide blades rotatably mounted in a blade bearing ring, an adjusting ring arranged on the bearing ring, an actuator configured to adjust the adjusting ring via a link lever, and
    an adjustable eccentric arranged on the link lever and guided in a groove arranged on the blade bearing ring,
    wherein the eccentric is configured to stop on at least one end of the groove to limit at least one minimal flow through the variable turbine geometry.

14. The charging device according to claim 13, wherein the eccentric is designed as an axial extension on a link lever head, and wherein the link lever head is configured to interact with the adjusting ring.

15. The charging device according to claim 13, wherein the groove on the blade bearing ring is open towards a face end and to the outside of the bearing ring.

16. The charging device according to claim 13, wherein the eccentric is at least one of caulked, riveted and spread to the link lever head.

17. The charging device according to claim 13, wherein the eccentric includes a sleeve body, which can be inserted into an opening formed in the link lever head, and a holding portion of the sleeve body is arranged in the interior of the opening, wherein a core body is arranged in the interior of the sleeve body to radially brace the holding portion in the opening and fixe the eccentric on the link lever head at least one of axially and rotationally.

18. The charging device according to claim 17, wherein the sleeve body in the holding portion includes an internal cone configured to interact with an external cone of the core body for radially bracing the holding portion.

19. The charging device according to claim 17, wherein the core body has at least one of a crowned and spherically curved outer cross section.

20. The charging device according to claim 17, wherein the sleeve body on its outside in the holding portion includes a friction-increasing layer, and wherein the friction-increasing layer is a chemical nickel matrix with silicon carbide particles embedded therein.

* * * * *